United States Patent
Cannan

(10) Patent No.: US 6,362,122 B1
(45) Date of Patent: Mar. 26, 2002

(54) REGENERATION OF SPENT ZEOLITE COMPOSITIONS

(75) Inventor: Thomas R. Cannan, Spanish Fort, AL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/435,686

(22) Filed: Nov. 8, 1999

(51) Int. Cl.[7] ............... B01J 20/35; B01J 34/64; B01J 38/48; B01J 21/20; B01J 29/06
(52) U.S. Cl. ............... 502/25; 502/20; 502/22; 502/56; 502/64; 502/87; 502/518
(58) Field of Search ............... 502/20, 22, 25, 502/56, 64, 77, 78, 79, 87, 503, 518

(56) References Cited

U.S. PATENT DOCUMENTS

| | | | |
|---|---|---|---|
| 3,929,669 A | * 12/1975 | Rosback et al. | 252/455 Z |
| 4,048,111 A | * 9/1977 | Rosback et al. | 252/455 Z |
| 4,139,433 A | 2/1979 | Ward | 208/111 |
| 4,272,288 A | * 6/1981 | Dessau | 75/101 BE |
| 4,382,023 A | * 5/1983 | Mulaskey | 252/455 Z |
| 4,510,254 A | * 4/1985 | Morris et al. | 501/146 |
| RE31,919 E | * 6/1985 | Butter et al. | 502/66 |
| 4,550,090 A | 10/1985 | Degnan et al. | 502/25 |
| 4,604,372 A | * 8/1986 | Morishita et al. | 502/62 |
| 4,876,228 A | * 10/1989 | Chang et al. | 502/71 |
| 4,919,790 A | * 4/1990 | Absil et al. | 208/78 |
| 4,929,338 A | * 5/1990 | Wprmsbecher | 208/120 |
| 4,975,399 A | 12/1990 | Gardner | 208/251 |
| 5,093,293 A | 3/1992 | Laukonen | 502/55 |
| 5,348,924 A | * 9/1994 | Potter et al. | 502/66 |
| 5,369,071 A | * 11/1994 | Degnan et al. | 502/71 |
| 5,880,052 A | * 3/1999 | Ramirez de Agudelo et al. | 502/66 |
| 5,885,439 A | * 3/1999 | Glover | 208/64 |
| 6,019,887 A | * 2/2000 | Ramirez De Agudelo et al. | 208/254 R |

* cited by examiner

Primary Examiner—Steven P. Griffin
Assistant Examiner—Cam N. Nguyen
(74) Attorney, Agent, or Firm—John G. Tolomei; Frank S. Molinaro

(57) ABSTRACT

A process for regenerating spent zeolite composites. The process involves contacting the composite, either as a shaped article or a fine powder, with a caustic solution, e.g., sodium hydroxide at treating condition. Once the contacting is completed, the composite is isolated, washed with water, dried and calcined to give a regenerated composite.

12 Claims, No Drawings

REGENERATION OF SPENT ZEOLITE COMPOSITIONS

This invention relates to a process for regenerating a spent zeolite composite which involves contacting the composite with a caustic solution followed by calcination.

BACKGROUND OF THE INVENTION

Zeolites have been used in a number of commercial processes for many years. With use these zeolites lose activity through various deactivation mechanisms. For example in adsorption processes contaminants such as hydrocarbons can be deposited onto the zeolite which over time become carbonaceous deposits. When these carbonaceous deposits reach a certain level, the zeolite can no longer function effectively and must be changed. The spent zeolite must be disposed of properly in compliance with EPA regulations.

An alternative to disposal is regeneration of the zeolite. The art discloses techniques for removing coke and/or other contaminants from zeolite compositions. One common regeneration technique is to burn the coke from the zeolite. However, applicant has found that merely burning coke off does not result in a zeolite with comparable performance to a fresh zeolite.

Other regeneration techniques include the use of steam or other solutions in combination with heating or calcining. For example, U.S. Pat. No. 5,093,293 discloses the use of steam for removing coke and other contaminants from Zeolite L. In U.S. Pat. No. 4,139,433 it is disclosed that a hydrocracking catalyst containing a Group VIII metal is regenerated by treating the spent catalyst with an ammonium hydroxide solution followed by calcination at 500° F. to 950° F. It is stated that the process redistributes the Group VIII metals and removes mono and divalent metal cations.

U.S. Pat. No. 4,975,399 discloses a two-step heating process to remove carbonaceous deposits from a hydrotreating catalyst. U.S. Pat. No. 4,550,009 discloses treating a spent catalyst with a source of alkali or alkaline earth metal cations or ammonia and then extracting extractable nitrogen compounds with a liquid organic solvent.

In contrast to this art, applicant has developed a process for regeneration of a zeolite (used as an adsorbent) which involves contacting the spent zeolite with a caustic solution followed by calcination. The caustic is sodium hydroxide or potassium hydroxide. The combination of the two steps removes the carbon residue and anneals the zeolite so that it has adsorption properties substantially the same as the fresh zeolite.

SUMMARY OF THE INVENTION

As stated, this invention relates to a process for regenerating a spent composite consisting essentially of a crystalline zeolite and a binder, the process comprising contacting the spent composite with an aqueous caustic solution at a temperature of about 20° C. to about 110° C. for a time of about 1 to about 48 hours, separating the composite from the caustic solution, washing the composite with water, drying the composite and calcining the dried composite at a temperature of about 500° C. to about 700° C. for a time of about 1 to about 24 hours.

This and other objects and embodiments of the invention will become more apparent after a detailed description of the invention.

DETAILED DESCRIPTION OF THE INVENTION

The composites which can be treated according to the instant process are any of those which only contain a zeolite and a binder. The zeolites which form the active part of the composite include but are not limited to Zeolite A, Zeolite Y, Zeolite X, mordenite, Zeolite beta and zeolites having the MFI structure, e.g., ZSM-5. The binders which are used in preparing the composites include clays, silica, alumina, and mixtures thereof. Specific examples of clays include attapulgite, bentonite, sepiolite, halloysite, and kaolinite. The zeolite and binder can be combined in various ratios but usually the binder is present from about 10 to about 90 wt. % of the composite.

The composite can be formed into various shapes by means well known in the art. Generally the zeolite and binder are combined along with water and optionally one or more additives selected from extrusion aids, dispersion aids, porosity modifiers, peptizing agents, etc. Examples of these additives are carboxymethylcellulose (extrusion aid), sodium salt of polyacrylic acid (dispersion aid), polyethylene (porosity modifier), nitric acid (peptizing agent). The zeolite, water and optional additive are homogeneously mixed by mulling, kneading, etc. Once a homogeneous mixture is obtained it is formed into shapes such as extrudates, pellets, pills, beads, etc., by means well known in the art. These shaped composites will possess the physical and chemical properties necessary for the intended use. For example, crush strength, attrition resistance, surface area, adsorption capacity, etc.

These composites are used in various adsorption processes where it is desirable to adsorb or separate one molecular species from another. One such process, which will be used to exemplify the invention, is the drying of natural gas. It should be pointed out that although composites that are used in drying of natural gas will be used as an example, the invention is not limited to those composites or the drying process. During the drying process (which uses the sodium form of Zeolite A as the zeolite component), the composite will also adsorb hydrocarbons such as hexanes, benzene, etc. When the composites contain from about 1 to about 10 wt. % carbon, usually about 5 wt. %, the zeolite has lost considerable adsorption capacity such that it is no longer effective in removing water from the natural gas. At this point the zeolite A containing composite is changed for fresh composite and the spent composite must be disposed of according to EPA regulations and procedures or regenerated according to the instant process.

The spent composites are regenerated according to the instant process by first contacting the composite with a caustic solution. The caustic solution is an aqueous solution with the caustic being sodium hydroxide, potassium hydroxide or mixtures thereof. It should be pointed out that by caustic solution is meant a strong base. Therefore, ammonium hydroxide which is defined as a weak base is not included in the definition of caustic. Additionally, ammonium hydroxide will exchange the alkali cation usually present in the zeolite and in some cases, e.g., zeolite A, will even destabilize the zeolite. The concentration of the strong base or caustic can vary from about 0.1N to about 4.0N. Prior to contacting the composite with the caustic solution one can optionally crush the composite to obtain a powder which can facilitate the contacting. Another optional step is to first heat the composite in air at a temperature of about 200° C. to about 800° C. and preferably in a range of about 400° C. to about 700° C. in order to remove carbonaceous deposits including volatile organic compounds.

The composite and caustic solution are contacted in a batch mode. The relative amount of composite which is added to the caustic solution can vary considerably but is usually that amount that will give a slurry which contains from about 5 to about 25 wt. % composite. The caustic solution and composite are contacted at treating conditions which include a time of about 1 to about 48 hours at a temperature of about 20° C. to about 110° C. Preferably the contacting time is from about 2 to about 24 hours with the longer times at the lower temperatures.

Once the contacting is complete, the solids are filtered from the caustic solution and the solids are washed with water to remove any residual caustic. The washed composite is now dried at a temperature of ambient temperature (i.e., about 20° C.) to about 200° C. for a time of about 1 to about 24 hours and then calcined at a temperature of about 500° C. to about 700° C. for a time of about 1 to 24 hours. Of course it is understood that the drying and calcining steps can be carried out in one step by using belt furnaces, rotary kilns and the like.

The regenerated composite is characterized in that it has at least 90% and preferably at least 95% of the key physical and chemical properties of the fresh composite. That is, if the key property for the particular application is water adsorption (i.e., for drying applications) then the regenerated zeolite composite should have at least 90% of the water adsorption of the fresh zeolite composite. Of course even though the other characteristics may not reach at least 90% of the fresh values, they should be at least 80% of the fresh values. If the degree of regeneration, i.e., percent of fresh performance, is not obtained in one step, then the procedure described above can be repeated one or more times.

In the case where the composite has been crushed into a powder, an additional step, after the drying step is to reform the crushed composite into a shaped article. This can be done by means well known in the art as described above. Namely, the powder is mixed with water and optionally additives to form a mass which can be formed into various shapes such as extrudates. If desired, additional binder may be added to the mixture. Once the shaped articles are formed, they are calcined at a temperature of about 500° C. to about 700° C.

Without wishing to be bound by any particular theory, it appears that the caustic serves a dual purpose. The high pH of the caustic solution provides adequate hydroxyls (OH⁻) to rehydroxylate the binder which was dehydroxylated during the initial calcination step. The rehydroxylation may release or "decomplex" the carbonaceous residue on the composite such that the carbonaceous residue is more easily burned off during the subsequent calcination. Additionally, it is hypothesized that the presence of the alkali metals in the caustic solution enables the reinsertion of non-framework aluminum atoms back into the framework thus affecting a "healing" of the damaged zeolite crystal and improving adsorption capacities dramatically.

In order to more fully illustrate the instant invention, the following examples are set forth. It is to be understood that the examples are only by way of illustration and are not intended as an undue limitation on the broad scope of the invention as set forth in the appended claims.

EXAMPLE 1

In a container there were placed 100 grams of a spent sodium form of zeolite A (herein NaA) composite (nominally ⅛" pellets) that had been used to dry natural gas and 1,000 grams of a 1N NaOH solution. The pellets were soaked in the sodium hydroxide solution without stirring for 18 hours at room temperature (which was about 25° C.). Next the pellets were separated from the caustic solution and washed with 5 liters of distilled water to remove any residual caustic on the pellets. The washed pellets were dried at 100° C. for 16 hours and then 90 g of the dried pellets were calcined at 600° C. for 1 hour. This sample was identified as sample A.

A sample of the spent zeolite composite was calcined at 600° C. in air without any other treatments. This sample was identified as sample B. The spent, treated and calcined pellets were tested for water, $O_2$ and $CO_2$ adsorption as well as for carbon content. Adsorption measurements were conducted on samples after a 350° C. treatment using a standard McBain-Bakr adsorption apparatus under the following conditions:

| Adsorbate | Temp. (° C.) | Pressure (torr) |
|---|---|---|
| $H_2O$ | R.T.* | 17.6 |
| $CO_2$ | R.T.* | 400 |
| $O_2$ | −196 | 75 |

*R.T. = Room Temperature which is about 25° C.

The results from these measurements as well as analysis for carbon are presented in Table 1.

TABLE 1

Characteristics of Treated and Untreated Na A Pellets

| Sample ID | Adsorption (Wt. %) | | | Carbon Content (Wt. %) |
|---|---|---|---|---|
| | $H_2O$ | $O_2$ | $CO_2$ | |
| Spent | 16.7 | 0.96 | 4.3 | 5.4 |
| Fresh | 22.8 | 18.8 | 12.6 | 0.4 |
| Sample A (regenerated) | 22.6 | 12.7 | 11.4 | 0.4 |
| Sample B (calcined only) | 18.0 | 2.1 | 4.1 | 1.4 |

The X-ray diffraction pattern of sample A was found to be equivalent to fresh NaA indicating no loss in crystallinity.

EXAMPLE 2

Spent NaA pellets were treated as in example 1 except that 0.1N NaOH was used. The regenerated NaA pellets had $H_2O$, $O_2$ and $CO_2$ adsorptions of 21.5, 12.5 and 9.5 wt. % respectively. The amount of carbon left on the pellets was 0.6 wt. %.

EXAMPLE 3

A series of experiments were carried out to determine the effect of base concentration on regeneration. In a container 20 g portions of spent NaA pellets were added to 200 g portions of water (control), 0.5N, 1.0N, 1.5N, 2.0N and 2.5N NaOH solution; the pellets were allowed to soak at room temperature for 16 hours, filtered, washed with 600 ml of water, dried at 100° C. for 2 hours and calcined at 600° C. for 1 hr. with a 35% air purge. The results from the adsorption measurements and analysis are presented in Table 2.

TABLE 2

Effect of NaOH Concentration On Regeneration

| NaOH Conc | Adsorption (Wt. %) | | | Carbon (Wt. %) |
|---|---|---|---|---|
| | $H_2O$ | $O_2$ | $CO_2$ | |
| No NaOH ($H_2O$ only) | 20.0 | 5.7 | 3.9 | 1.1 |
| 0.5N | 22.1 | 14.2 | 10.9 | 0.21 |

TABLE 2-continued

Effect of NaOH Concentration On Regeneration

| NaOH Conc | Adsorption (Wt. %) | | | Carbon (Wt. %) |
|---|---|---|---|---|
| | $H_2O$ | $O_2$ | $CO_2$ | |
| 1.0N | 22.8 | 16.1 | 12.3 | 0.21 |
| 1.5N | 23.6 | 17.7 | 13.9 | 0.10 |
| 2.0N | 23.9 | 18.4 | 13.0 | 0.82 |
| 2.5N | 23.7 | 19.2 | 15.0 | 0.07 |

As can be seen, increasing the NaOH concentration improves the oxygen and carbon dioxide adsorption.

EXAMPLE 4

A series of experiments were carried out to determine the effect of soak time on regeneration. Containers were set up containing 20 g portions of spent NaA and 200 g of 1N NaOH solution. The pellets were soaked for various times, filtered, washed with water, dried at 100° C. for 16 hours and calcined at 600° C. for 1 hour with a 35% air purge. Adsorption results are presented in Table 3.

TABLE 3

Effect of Contact Time on Regeneration

| Time (hrs) | Adsorption (Wt. %) | | |
|---|---|---|---|
| | $H_2O$ | $O_2$ | $CO_2$ |
| 1 | 21.5 | 9.6 | 8.9 |
| 2 | 21.9 | 10.1 | 9.7 |
| 4 | 21.1 | 12.2 | 11.0 |
| 6 | 21.6 | 12.6 | 11.2 |
| 8 | 22.3 | 14.6 | 11.6 |

Contact time affects $O_2$ and $CO_2$ capacity most.

EXAMPLE 5

In a container 1 kg of spent NaA composite which had been ground to a fine powder was mixed with 10 kg of 1.0N NaOH solution. The resultant slurry was stirred at room temperature for 4 hours, filtered, and then washed with 24 liters of water. Next the filter cake obtained after washing was dried to a 38% LOI (loss on ignition), mulled for 30 minutes and extruded. The resultant pellets were dried at 100° C. for 3 days and then calcined at 650° C. for 1 hour with a 35% air purge. These pellets had $H_2O,O_2$ and $CO_2$ adsorption capacities of 20.3, 14.8 and 10.2 wt. % respectively.

EXAMPLE 6

In a 1 liter, 3 neck flask fitted with a condenser, stirrer and thermocouple there were mixed 70 g of spent NaA composite that had been ground to a fine powder and 700 g of 1N NaOH. The slurry was heated to reflux and held at reflux for 1 hour at which point the slurry was filtered and the solid washed with 1,400 ml of water, dried overnight and then calcined at 650° C. for 1 hour with a 35% air purge. The dried sample and dried and calcined samples were tested for adsorption capacities and the results are presented in Table 4.

TABLE 4

| Sample ID | Adsorption (Wt. %) | | |
|---|---|---|---|
| | $H_2O$ | $O_2$ | $CO_2$ |
| Dried Sample | 16.0 | 12.3 | 8.1 |
| Calcined Sample | 21.1 | 18.9 | 13.3 |

Comparing the results of example 6 with example 5 it is observed that increasing the temperature allows the regeneration to proceed at a much faster rate and more completely. The results in example 6 also show that merely treating the spent powder with caustic at elevated temperatures is not sufficient to adequately regenerate the zeolite composite.

I claim as my invention:

1. A process for regenerating a spent composite consisting essentially of a crystalline zeolite and a binder, the process comprising contacting the spent composite with an aqueous caustic solution at a temperature of about 20° C. to about 110° C. for a time of about 1 to about 48 hours, separating the composite from the caustic solution, washing the composite with water, drying the composite, and calcining the dried composite at a temperature of about 500° C. to about 700° C. for a time of about 1 to about 24 hours.

2. The process of claim 1 where the composite is dried at a temperature of about 20° C. to about 200° C. for a time of about 1 to about 24 hours.

3. The process of claim 1 where the drying and calcining steps are combined into one step.

4. The process of claim 1 further characterized in that prior to contacting the composite with the caustic solution, the composite is heated in air at a temperature of about 200° C. to about 800° C. in order to remove carbonaceous deposits.

5. The process of claim 1 further characterized in that the composite is crushed to a fine powder prior to contacting with the caustic solution.

6. The process of claim 5 further characterized in that after the composite is dried, it is formed into an extrudate prior to calcining.

7. The process of claim 1 where the caustic solution is selected from the group consisting of sodium hydroxide solution, potassium hydroxide solution and mixtures thereof.

8. The process of claim 1 where the caustic solution has a caustic concentration of about 0.1 N to about 4.0 N.

9. The process of claim 1 where the zeolite is selected from the group consisting of zeolite A, zeolite Y, zeolite X, mordenite, zeolite beta and ZSM-5.

10. The process of claim 9 where the zeolite is zeolite A.

11. A process for regenerating a spent composite consisting essentially of zeolite A and a binder, the process comprising crushing the composite to a fine powder contacting the powder with a caustic solution selected from the group consisting of sodium hydroxide solution, potassium hydroxide solution and mixtures thereof at a temperature of about 20° C. to about 110° C. for a time of about 1 to about 48 hours, separating the composite from the caustic solution, washing the composite with water, drying the composite, forming the dried composite into an extrudate, and calcining the dried composite at a temperature of about 500° C. to about 700° C. for a time of about 1 to about 24 hours.

12. The process of claim 11 where the composite is dried at a temperature of about 20° C. to about 200° C. for a time of about 1 to about 24 hours.

* * * * *